(12) United States Patent
Ohlendorf (10) Patent No.: US 12,295,539 B2
(45) Date of Patent: May 13, 2025

(54) FILTER DEVICE FOR A VACUUM CLEANER AND FILTER DEDUSTING METHOD

(71) Applicant: Hilti Aktiengesellschaft, Schaan (LI)

(72) Inventor: Oliver Ohlendorf, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 65 days.

(21) Appl. No.: 18/024,214

(22) PCT Filed: Sep. 9, 2021

(86) PCT No.: PCT/EP2021/074767
§ 371 (c)(1),
(2) Date: Mar. 1, 2023

(87) PCT Pub. No.: WO2022/063586
PCT Pub. Date: Mar. 31, 2022

(65) Prior Publication Data
US 2023/0284853 A1    Sep. 14, 2023

(30) Foreign Application Priority Data

Sep. 23, 2020  (EP) ..................................... 20197764

(51) Int. Cl.
*A47L 9/20* (2006.01)
*A47L 9/00* (2006.01)
(Continued)

(52) U.S. Cl.
CPC ................ *A47L 9/20* (2013.01); *A47L 9/0072* (2013.01); *B01D 46/4272* (2013.01);
(Continued)

(58) Field of Classification Search
CPC ........... A47L 9/20; B01D 46/04; B01D 46/66; B01D 46/70; B01D 46/71; B01D 46/72; B01D 46/86; B01D 46/4272
(Continued)

(56) References Cited

U.S. PATENT DOCUMENTS 3,521,430 A  *  7/1970  Vanderlip ............... B01D 46/71
                                                         55/284
2021/0402339 A1* 12/2021 Fogelberg ................. A47L 9/16

FOREIGN PATENT DOCUMENTS

CN      111905487 B  *  9/2024  ......... B01D 46/2411
DE     102016101414 A1     7/2017
(Continued)

OTHER PUBLICATIONS

U.S. Appl. No. 18/024,372, filed Mar. 2, 2023 as national phase of PCT/EP2021/074947 now published as WO2022063606 A1 on Mar. 31, 2022.
U.S. Appl. No. 18/024,214, filed Mar. 1, 2023 as national phase of PCT/EP2021/074767 now published as WO2022063586 A1 on Mar. 31, 2022.
(Continued)

*Primary Examiner* — Bryan R Muller
(74) *Attorney, Agent, or Firm* — Davidson Kappel LLC (57) ABSTRACT

A filter device for a vacuum cleaner. The filter device has two chambers, of which in each case at least one participates in suction operation of the vacuum cleaner, while a filter element of the other chamber can be dedusted. As a result, while one filter element is being dedusted, suction operation can be maintained through the other chamber of the vacuum cleaner. This advantage is allowed by an elastic membrane, which can change shape and/or move when the chamber to be dedusted is ventilated. The ventilation is effected by a pressure equalizing stream which can pass through a ventilation channel and a ventilation opening into the chamber to be dedusted. As a result of the movement and/or change in shape of the elastic membrane, a dedusting pulse is applied to the filter element, which can ensure, for example, that a solid filter cake is detached and drops into the dust collecting tank of the vacuum cleaner. A method for dedusting a filter device in a vacuum cleaner is also provided.

10 Claims, 9 Drawing Sheets

(51) Int. Cl.
  *B01D 46/42*   (2006.01)
  *B01D 46/58*   (2022.01)
  *A47L 5/36*    (2006.01)
  *A47L 9/12*    (2006.01)

(52) U.S. Cl.
  CPC .............. *A47L 5/365* (2013.01); *A47L 9/122* (2013.01); *B01D 46/58* (2022.01); *B01D 2279/55* (2013.01)

(58) Field of Classification Search
  USPC ......... 55/284, 286, 288, 293, 298, 300, 302, 55/304, 305
  See application file for complete search history.

(56)            References Cited

FOREIGN PATENT DOCUMENTS

WO     WO 2022/063605 A1   3/2022
  WO     WO 2022063586 A1    3/2022
  WO     WO2022063606 A1     3/2022

OTHER PUBLICATIONS

U.S. Appl. No. 18/024,653, filed Mar. 3, 2023 as national phase of PCT/EP2021/074946 now published as WO2022/063605 A1 on Mar. 31, 2022.
International Search Report of PCT/EP2021/074947 dated Jan. 5, 2022.
International Search Report of PCT/EP2021/074767 dated Jan. 5, 2022.
International Search Report of PCT/EP2021/074946 dated Jan. 5, 2022.

\* cited by examiner

FILTER DEVICE FOR A VACUUM CLEANER AND FILTER DEDUSTING METHOD

In a first aspect, the invention relates to a filter device for a vacuum cleaner.

BACKGROUND

On construction sites, use is often made of vacuum cleaners in order to suck up or suck in dirt particles in the form of dust, drilling dust or the like. In order to collect the dirt, a negative pressure is generated inside the vacuum cleaner by means of a turbine. Via a hose, which is connected to the vacuum cleaner, the negative pressure is used in order to suck up the dirt particles and transport them into a collecting tank of the vacuum cleaner. Commercially available vacuum cleaners are usually built such that the turbine, a filter, the collecting tank and the inlet opening for the sucked-in dirt particles are located one after another, or on a flow path. Usually, the filter is positioned between the collecting tank, or the inlet opening for the sucked-in dirt particles, and the turbine that generates a negative pressure. Since the sucked-in air containing dirt particles would flow through the turbine and consequently soil or damage the turbine, the filter serves to clean the sucked-in air and thus in particular to protect the turbine.

SUMMARY OF THE INVENTION

However, a problem can arise when the filter can no longer provide a sufficient filtering function and sucked-in dirt particles can no longer be filtered out of the air flowing through the filter. This is the case in particular when, on account of the vacuum cleaner being used for a relatively long time, the filter is increasingly dirty, i.e. filled with dirt particles. In order to keep the filter functional, it has to be intermittently cleaned and freed of the dirt particles it has taken up. However, to clean the filter in commercially available vacuum cleaners, said vacuum cleaners have to be switched off, the cleaner opened and the filter taken out in order to remove the dirt particles it has taken up. Such activities interrupt the vacuuming process, however, and are very time-consuming.

According to the prior art, there already also exist vacuum cleaners that have an apparatus for dedusting the filter without the vacuum cleaner having to be switched off, opened and the filter taken out in order to remove the dirt particles it has taken up. A drawback of such apparatuses, however, is that, even in these vacuum cleaners, suction operation of the vacuum cleaner has to be interrupted while the filter is being dedusted. This also makes working with the vacuum cleaner lengthier. Moreover, such known filter dedusting apparatuses frequently have a complex structure and are assembled from a large number of components. As a result, conventional filter dedusting apparatuses, as are known from the prior art, are frequently susceptible to faults or wear or in need of servicing.

It is an object of the present invention to overcome the above-described deficiencies and drawbacks of the prior art and to provide an improved filter device for a vacuum cleaner, with which suction operation of the vacuum cleaner does not have to be interrupted while the filter is being dedusted.

The present disclosure provides a filter device for a vacuum cleaner, wherein the filter device comprises a turbine and a motor for generating a first main air stream and/or a second main air stream in the vacuum cleaner. The filter device is characterized by a first chamber and a second chamber, which each have a filter element, a ventilation opening and a turbine opening, wherein, during suction operation through at least one of the chambers, the turbine opening of the respective chamber is open such that a flow connection exists between the chamber and the turbine device, and the ventilation opening is closed such that a negative pressure prevails in the chamber, wherein a dedusting process of a filter element is initiated by actuation of a valve, such that a pressure equalizing stream that brings about a change in pressure passes into the chamber, wherein, as a result of the change in pressure, the turbine opening is closed by an elastic membrane and a dedusting pulse is applied to the filter element.

Tests have shown that the filter device ensures a good and interruption-free extraction performance—even during the filter dedusting of one of the two chambers. As a result of the elastic membrane and the configuration thereof, and the pressure distribution, controlled thereby, in the different regions of the vacuum cleaner, alternate dedusting of the two chambers with, at the same time, ongoing suction operation of the other chamber in each case can be allowed. As a result, a highly efficient possibility, optimized in terms of installation space, for filter dedusting is provided in a vacuum cleaner. The filter device in particular has a relatively simple structure. Use tests have shown that the filter device is particularly robust and not very susceptible to repairs and wear. In particular the elastic membrane contributes to these advantages of the invention, said elastic membrane, according to a preferred configuration of the invention, comprising an elastic material and being able to change its shape or move when it is subjected to a pressure or experiences a change in pressure conditions.

According to the invention, it is preferred that the elastic membrane is very stretchable in the elastic range. For example, stretching in a range between 150 and 300% is possible. Materials that can be used for example in the production of the elastic membrane are synthetic rubbers, such as chloroprene rubber (CR) or styrene butadiene rubber (SBR/SCR).

According to the invention, it is preferred that the turbine opening is closed by a change in shape and/or by a movement of the elastic membrane. The elastic membrane is preferably in a relaxed state when a negative pressure prevails in the corresponding chamber of the vacuum chamber and the chamber is participating in the suction operation of the vacuum cleaner. In this relaxed state, the elastic membrane can be arranged for example substantially horizontally within the one chamber. Possible arrangements of the elastic membrane in the relaxed state are illustrated for example in FIGS. 1 to 3.

In the chambers participating in the suction operation of the vacuum cleaner, the elastic membrane is preferably in the relaxed state. In this suction operation, a suction stream forms from the dust collecting tank of the vacuum cleaner to the turbine of the vacuum cleaner, wherein this suction or main air stream flows in particular through the chambers participating in the suction operation. The transition between the chambers and the turbine is preferably marked by the turbine openings of the chambers. Between the turbine openings of the chambers and the turbine there extend the flow channel portions, which are thus arranged between the turbine and the turbine openings of the chambers. According to the invention, it is preferred that the flow connection between the chambers and the turbine device is formed by flow channel portions.

On its way from the dust collecting tank of the vacuum cleaner to the turbine thereof, the suction stream first of all passes through the filter elements, which are designed to take up a substantial proportion of the dust with which the air is laden and to filter it out of the suction stream. This is because the dust would represent a risk to the turbine and the motor of the vacuum cleaner if too much dust were to pass into the region of the turbine or motor. According to the invention, it is preferred that two filter elements are provided in the vacuum cleaner or the filter device, said filter elements each being connected to a chamber. In other words, the suction stream sucked into the collecting tank through a suction hose inlet is split into two main air streams, wherein a first main air stream passes through the first chamber to the turbine while a second main air stream passes through the second chamber to the turbine. In terms of flow, the two chambers are located upstream of the filter elements that filter the dust out of the main air streams. The inlet region of the chambers is preferably referred to as the inflow opening according to the invention, wherein the inflow openings are closed by the filter elements with respect to the collecting tank.

According to the invention, it is preferred that, during suction operation, the main air streams pass from the duct collecting tank, through the filter elements and the inflow openings into the chambers, wherein, during suction operation, the main air streams pass further, through the open turbine openings, into the flow channel portions. As a result, a flow path between the suction hose inlet in the collecting tank and the turbine is advantageously formed.

In the course of suction operation, the filters of the filter device can become clogged. This can occur for example in that a filter cake solidifies on or adheres to the filter and clogs the latter or reduces its filtering capacity. In order to free up the filter elements again and to increase their filtering capacity, what is known as filter dedusting can be carried out. In this connection, the provision of two chambers with two filter elements, which can be dedusted alternately, has proven to be very advantageous. This is because it is an essential advantage of the present invention that the dedusting of the filter element of one of the two chambers can take place while suction operation through the other chamber continues. As a result, the operation of the vacuum cleaner does not have to be interrupted for filter dedusting and the user has an essential time saving and increase in efficiency compared with conventional appliances that have to be switched off during filter dedusting. In particular, the advantages of the invention are based on the splitting of the suction stream into two main air streams, which can flow through different chambers. Furthermore, the elastic membrane contributes to the success, according to the invention, of the filter device, said elastic membrane, on account of its elastic properties, being able to change its shape or being configured in a movable manner such that, during ventilation or dedusting, it can close off the turbine opening of the chamber to be dedusted and can apply a dedusting pulse to the filter element to be dedusted.

In order to initiate a dedusting process, the chamber of which the filter element is intended to be dedusted is ventilated. According to the invention, the term "ventilation" is used to refer to a weakening or collapse of the negative pressure in the chamber to be dedusted. The ventilation takes place preferably in that the valve that each of the two chambers has can be put into a ventilation position. During suction operation through a chamber, the valve is in a suction-operation position, in which it closes off the ventilation opening of the chamber. As a result, the dust collecting tank, the chambers participating in suction operation, and the flow channel portions that extend from the turbine openings to the turbine form a negative-pressure region within the vacuum cleaner. These negative-pressure regions are shown in a dark color in FIGS. 3 to 9.

If the dedusting operation is now intended to be started, the valve can be moved from the suction-operation position into a dedusting position. This can take place by means of a simple pushing movement of the valve. Preferably, the actuation of the valve has the result that the ventilation opening is opened by the valve. According to the invention, it is particularly preferred that the valves can be moved by actuators. Preferably, the valves can have openings, wherein these openings can be brought into correspondence with the ventilation openings by movement of the valves. When the openings of the valves coincide with the ventilation openings of the chamber to be dedusted, a flow connection arises between the ventilation openings and ventilation channels that are arranged between the vacuum cleaner head and the dust collecting tank and are fluidically connected to the environment of the vacuum cleaner.

Through the ventilation openings, an air stream can pass into the chamber to be dedusted, wherein, according to the invention, this ventilation air stream can preferably also be referred to as pressure equalizing stream. According to the invention, it is preferred that the ventilation openings are arranged between the chambers and ventilation channels. The pressure equalizing stream flows from the environment of the vacuum cleaner through the ventilation channels and the open ventilation openings into the chamber to be dedusted and weaken or reduce the negative pressure therein. In other words, the pressure equalizing stream ensures that the pressure in the chamber to be dedusted is adapted to or equalized with the external pressure or ambient pressure of the vacuum cleaner. The pressure equalizing stream is indicated as a dashed-line arrow in FIGS. 4, 5, 7 and 8.

According to the invention, the equalizing of the pressure conditions in the chamber to be dedusted to the vacuum cleaner environment or the ambient pressure is preferably also referred to as a pressure change which is brought about by the pressure equalizing stream. According to the invention, it is preferred that the equalizing of the pressure conditions or the pressure change results in the elastic membrane moving and/or changing shape in the chamber to be dedusted. In particular, the elastic membrane can pass from its relaxed suction operation state into a pressurized state. For example, the elastic membrane can pass from a first, relaxed state in to a second state, wherein, in this second state, the membrane closes off, for example, the turbine opening of the chamber to be dedusted. This closing off of the turbine opening by the elastic membrane is illustrated for example in FIGS. 4 and 7. According to the invention, it is preferred that the elastic membrane leaves the turbine opening open in the first, relaxed state and allows the main air stream to pass through the corresponding chamber of the vacuum cleaner. In other words, during suction operation, a main air flow can form from the collecting tank to the turbine, wherein this main air stream can pass in a manner unimpeded by the elastic membrane through the chamber participating in suction operation. According to the invention, it is also preferred that, in the second, pressurized state, the elastic membrane closes off the turbine opening such that the main air stream is prevented from passing through the corresponding chamber of the vacuum cleaner and suction operation through this chamber is interrupted.

Figure 5:
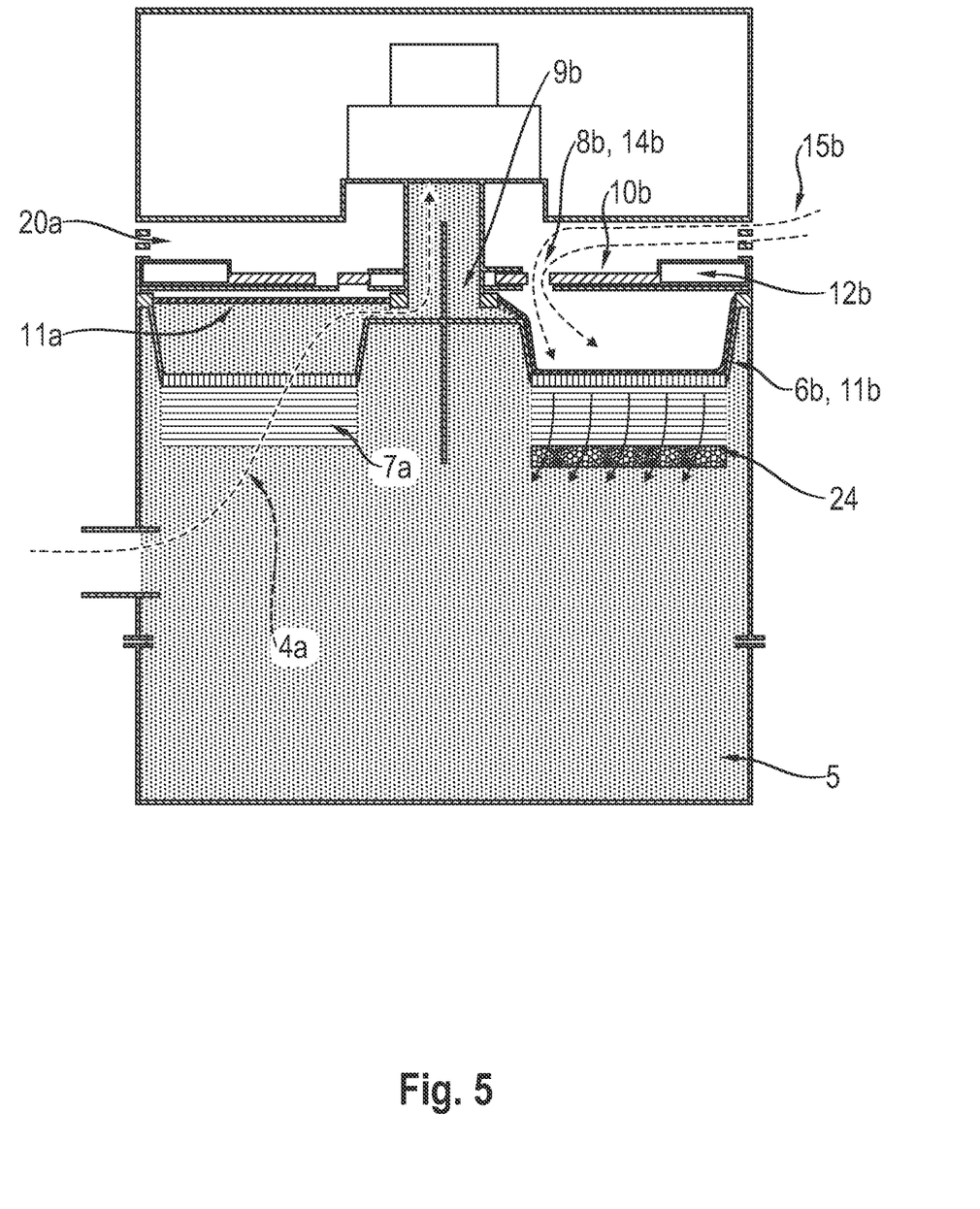
FIG. 5 shows a schematic illustration of the vacuum cleaner while the filter element of the second chamber is being dedusted
Figure 8:
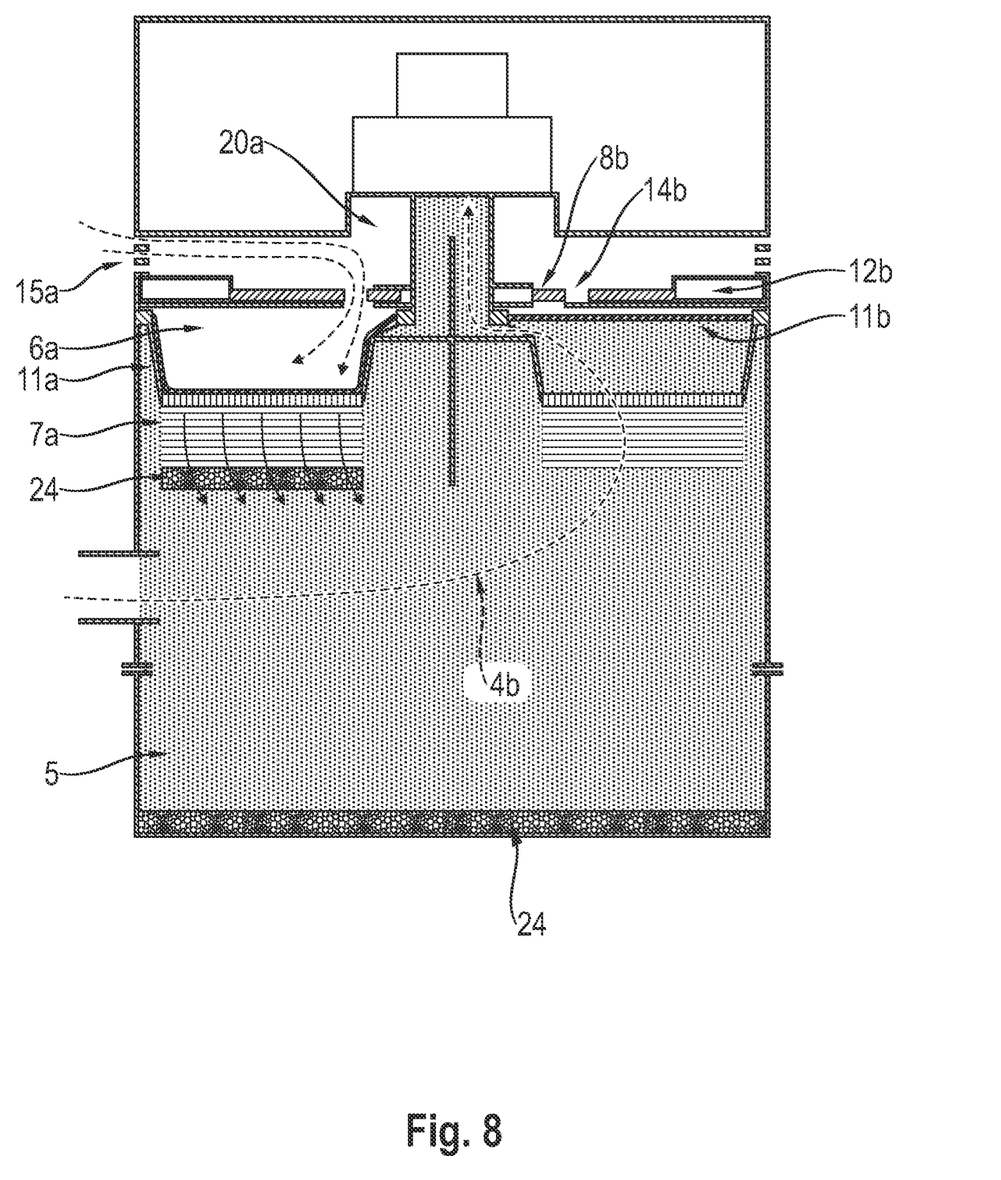
FIG. 8 shows a schematic illustration of the vacuum cleaner while the filter element of the first chamber is being dedusted

According to the invention, it is preferred that the elastic properties of the elastic membrane are configured such that the elastic membrane can move further in the event of ventilation and can bear for example against the inner walls of the chamber to be dedusted (cf. FIGS. 5 and 8). According to the invention, the bearing of the elastic membrane against the inner walls of the chamber to be dedusted can be referred to as a third state of the elastic membrane. According to the invention, it is preferred that the transition of the elastic membrane from the first state into the second state or third state, or back, is referred to as a change in shape or movement of the elastic membrane. Preferably, the elastic membrane can take up not just these three described states but also any conceivable intermediate steps or states.

In particular, the elastic membrane is preferably designed to compress the air that was previously located between the membrane and the filter element to be dedusted, such that a pressure shock is formed, which is referred to as a dedusting pulse or dedusting shock according to the invention. This compression pressure shock is transmitted to the filter element and advantageously results in backflushing of the filter and/or in mechanical shaking of the filter element. The intensity or strength of the dedusting pulse is preferably configured such that a solid filter cake is detached from the filter element and drops into the dust collecting tank of the vacuum cleaner, such that it can be disposed of at a later time. According to the invention, the transmission of the compression pressure shock is also referred to as the application of a dedusting pulse to the filter element.

The upper region of the vacuum cleaner can be formed by a vacuum cleaner head, while the lower region of the vacuum cleaner is formed by the dust collecting tank. Located in the vacuum cleaner head are, for example, the turbine and the motor, with which the negative pressure for sucking in the dust particles and drilling dust is generated. Provided between the vacuum cleaner head and the dust collecting tank are ventilation channels with which air can be sucked in from the environment of the vacuum cleaner through openings in the housing. This air sucked in through the ventilation channels can form, for example, a pressure equalizing stream, which equalizes the pressure in the chamber to be dedusted, or adapts the pressure prevailing therein to ambient pressure. The collecting tank can furthermore have a suction hose inlet to which a vacuum cleaner hose can be attached. According to the invention, it is preferred that the ventilation channels are arranged between a dust collecting tank and a vacuum cleaner head of the vacuum cleaner.

According to the invention, it is preferred that the turbine opening is designed to allow a flow connection between one of the chambers and the turbine, wherein this flow connection exists between the chambers and the turbine device in particular during operation of the vacuum cleaner. Preferably, the flow connection is formed by a flow channel portion that is formed between the turbine opening of one of the chambers and the turbine. This flow channel portion is open in particular during operation of the vacuum cleaner in order that the negative pressure generated by the turbine can be used to suck in or up dust.

According to the invention, it is preferred that a negative pressure prevails in the corresponding chamber when the associated ventilation opening is closed and the turbine opening is open. In this case, extraction operation takes place through the corresponding chamber and dust particles can be sucked into the collecting tank by the associated main air stream. According to the invention, it is also preferred that, during suction operation through the one chamber, the filter element in the other chamber can be dedusted.

According to the invention, it is preferred that the ventilation channels are arranged between the collecting tank and the suction head. The collecting tank forms the lower region of the vacuum cleaner, in which the dust sucked in by the vacuum cleaner is captured and stored until the vacuum cleaner is emptied. According to the invention, it is preferred that the first and the second chamber are constituents of the collecting tank. In other words, the first chamber and the second chamber are arranged in the collecting tank of the vacuum cleaner. In a preferred configuration of the invention, the chambers have inflow openings which are delimited with respect to the collecting tank by filter elements. Preferably, the filter elements are designed to close off the inflow openings such that dust particles can be filtered out of the main air streams, wherein, during suction operation, the main air streams are formed between the suction hose inlet of the dust collecting tank and the turbine. It is these filter elements between the chambers and the remaining volume of the collecting tank that are intended to be dedusted in the context of the present invention. As a result of the direct and immediate connection between the filter elements and the collecting tank, dust particles and filter cakes that are detached from the filter elements during dedusting can pass directly into the collecting tank and be disposed of the next time the tank is emptied.

The suction head preferably forms the upper region of the vacuum cleaner; it is preferably also referred to as the "vacuum cleaner head". The suction head preferably comprises the turbine device of the vacuum cleaner, and a motor. Arranged between the suction head and the collecting tank are ventilation channels, which can be delimited toward the outside, i.e. with respect to the environment of the vacuum cleaner, by subregions of the cleaner housing. These subregions of the cleaner housing preferably have ventilation openings or ventilation slots, through which air can be sucked into the interior of the vacuum cleaner. According to the invention, it is particularly preferred that the air is sucked into the ventilation channels, wherein the air can pass from there into the chambers of the filter device. The air stream from the ventilation channel into the chamber to be dedusted forms, in a particularly preferred configuration of the invention, a pressure equalizing stream, which can pass through the open valve and through the ventilation opening from the ventilation channel into the chamber. In other words, when the valves are opened, a pressure equalizing stream can pass into the chambers of the vacuum cleaner. According to the invention, it is preferred that the valves can each be moved, i.e. opened or closed, by a respective adjusting element.

According to the invention, it is preferred that, during operation of the vacuum cleaner, a negative pressure prevails in the collecting tank and in at least one of the two chambers. Preferably, the negative pressure can be generated by the turbine device in the suction head. By means of the negative pressure, dust particles or drilling dust can be sucked into the interior of the vacuum cleaner. The collecting tank of the vacuum cleaner preferably has a suction hose inlet, through which the dust particles or the drilling dust can be sucked in, in particular when the inlet is connected to a suction hose and the vacuum cleaner is in suction operation. Suction operation is preferably characterized in that vacuum cleaner generates a negative pressure with its turbine device. The suction operation generates main air streams through the chambers of the vacuum cleaner that participate in suction operation, wherein the main air streams preferably flow from the suction hose inlet to the turbine device.

In a second aspect, the invention relates to a method for dedusting a filter device in a vacuum cleaner, wherein the method is characterized by the following steps:
a) providing a filter device in a vacuum cleaner,
b) operating the vacuum cleaner, wherein, during operation of the vacuum cleaner, a negative pressure prevails in a collecting tank of the vacuum cleaner and in at least one chamber of the vacuum cleaner,
c) actuating a valve, with the result that a ventilation opening is opened such that a pressure equalizing stream that brings about a change in pressure passes into the chamber and, as a result of the change in pressure, a turbine opening of the chamber is closed by an elastic membrane, and
d) dedusting a filter element by means of a dedusting pulse that is applied to the filter element by the elastic membrane.

According to the invention, it is preferred that the vacuum cleaner to be provided has a filter device which has two chambers, each with a filter element, a ventilation opening and a turbine opening. Elastic membranes are provided in each of the chambers, said elastic membranes being able to adopt different shapes or states under different pressure conditions in the chambers. For example, the elastic membranes can be in a substantially horizontal arrangement in the chambers in a relaxed state, wherein this relaxed state is taken up in particular during suction operation of the vacuum cleaner. According to the invention, it is preferred that a negative pressure prevails in the chambers that participate in suction operation.

According to the invention, it is preferred that the elastic membranes can move or change their shape, i.e. their state, when the pressure conditions in the chambers change. If, for example, one of the chambers is ventilated and the pressure in the ventilated chamber to be dedusted is equalized with ambient pressure, the elastic membrane can bend and take up for example a second state, wherein the elastic membrane seals off the turbine opening of the corresponding chamber in this second state (cf. FIGS. 4 and 7). The bending can also include, in particular, a deformation of the elastic membrane or of the elastic material. As a result of the turbine opening being sealed off, the main air stream is prevented from passing through this chamber and the chamber no longer participates in the suction operation of the vacuum cleaner, while the suction operation of the vacuum cleaner is maintained by the other chamber, which is not being ventilated.

The elastic membrane can furthermore bend or deform to a greater extent and take up for example a third state in which the elastic membrane bears against the inner walls of the chamber to be dedusted (cf. FIGS. 5 and 8). In this state, the elastic membrane compresses the air that was previously located between the filter element and membrane to such an extent that a pressure shock is transmitted to the filter element. The pressure shock causes mechanical shaking of the filter element, wherein, as a result of the shaking, any filter cake adhering to the filter element is detached such that it can drop into the dust collecting tank. According to the invention, it is preferred for the first or the relaxed state of the elastic membrane to be referred to as a parked state or parked position, while the second state, in which the elastic membrane closes off the turbine opening, can be referred to as the closed position. Preferably, the third state of the elastic membrane can be referred to as a dedusting state or dedusting position.

According to the invention, it is preferred that, as a result of the valve being actuated, the ventilation opening of the chamber to be dedusted is opened, such that a ventilation or pressure equalizing stream can pass into the chamber. This ventilation or pressure equalizing stream is preferably designed to bring about the change in shape or movement of the elastic membrane, which result in the changes in state of the elastic membrane. According to the invention, it is preferred that the changes in state of the elastic membrane generate a dedusting pulse with which the filter element is dedusted. Preferably, the elastic membrane is designed to apply a dedusting pulse to the filter element. According to the invention, it is particularly preferred that the dedusting pulse is generated by a movement or a change in shape, position or state of the elastic membrane.

It is an essential advantage of the invention that the dedusting of the filter element of one of the two chambers takes place while suction operation through the other chamber continues. In particular, with the filter device, i.e. in particular with the elastic membrane, a pressure-controlled valve can be provided for the turbine openings of the chambers, wherein the filter device can furthermore be integrated in a compact manner in a vacuum cleaner. Moreover, a robust basic structure of a vacuum cleaner can be realized with the invention since the filter device has a relatively small number of mechanical components. A particular advantage of the invention is represented by the extraordinarily high compression rate with which the remaining air within the chamber to be dedusted is compressed when the elastic membrane passes from the second state into the third state. As a result of this surprisingly high compression rate, in particular a particularly effective dedusting efficiency can be achieved by a relatively small remaining volume of air to be moved.

In particular, the invention also relates to a vacuum cleaner having a filter device according to the invention. The definitions, technical effects and advantages that have been described for the filter device apply analogously to the filter dedusting method and the vacuum cleaner, which has a filter device.

According to the invention, it is preferred that the valves are configured as slide valves. They represent regulating elements with which the turbine opening or the ventilation opening can be closed or opened. The slide valves can be in the form of flat elements, wherein, according to the invention, round or other shapes may also be preferred.

BRIEF DESCRIPTION OF THE DRAWINGS

Further advantages will become apparent from the following description of the figures. Various exemplary embodiments of the present invention are illustrated in the figures. The figures, the description and the claims contain numerous features in combination. A person skilled in the art will expediently also consider the features individually and combine them to produce useful further combinations.

In the figures, identical and similar components are denoted by the same reference signs.

In the figures.

DETAILED DESCRIPTION

Figure 1:
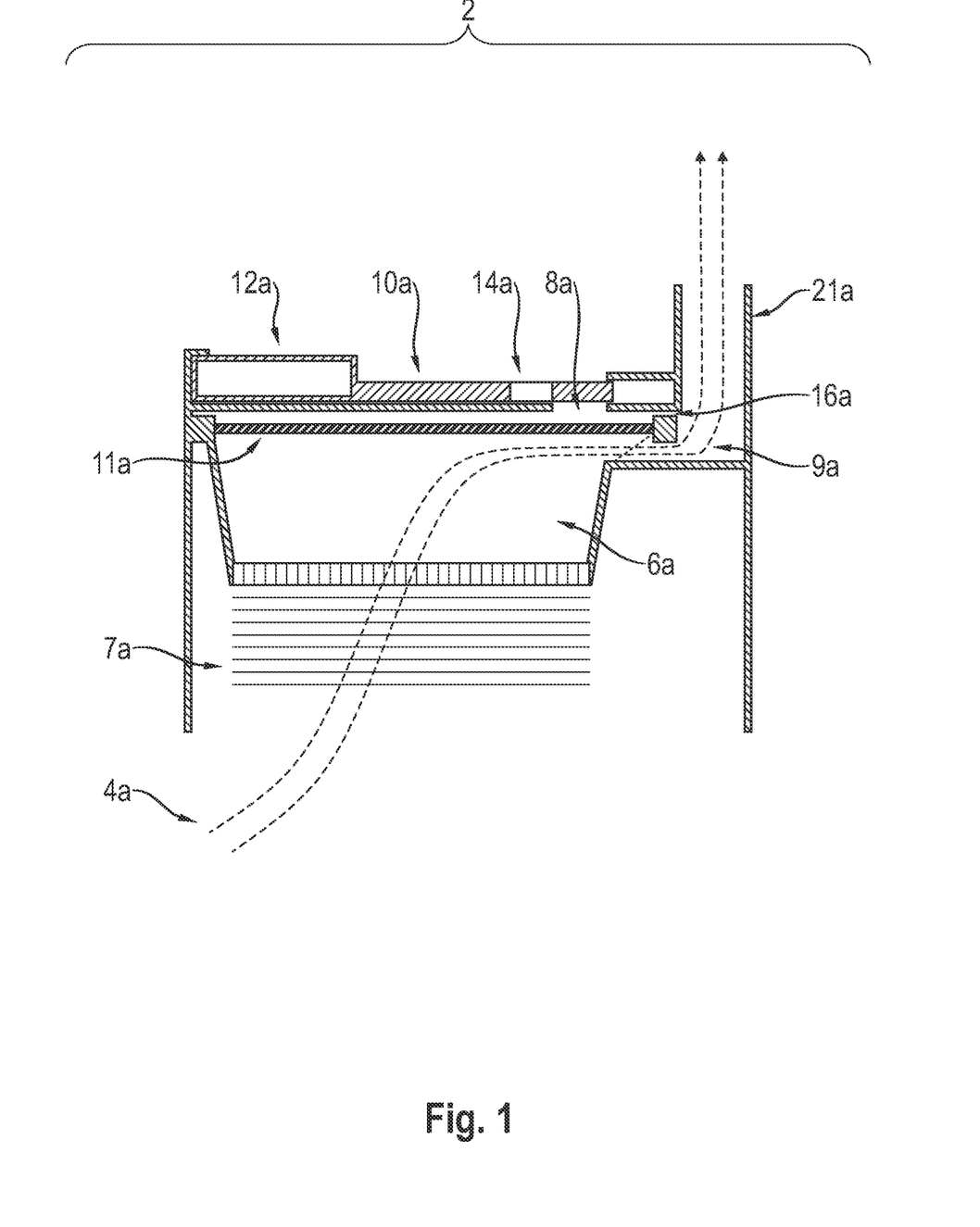
FIG. 1 shows a schematic side view of a preferred embodiment of the filter device

FIG. 1 shows a schematic side view of a preferred embodiment of the filter device 2. For reasons of greater clarity, FIG. 1 illustrates a first chamber 6a, which corresponds to the left-hand one of the two chambers 6a, 6b in FIGS. 3 to 9. FIG. 1 illustrates the first chamber 6a, which has a first inflow opening 13a (see, e.g., FIG. 2), a first ventilation opening 8a, and a turbine opening 9a. The first chamber 6a is arranged in an upper region of the dust collecting tank 5 of the vacuum cleaner 1 and is closed off with respect to the dust collecting tank 5 by a filter element 7a. When, during suction operation, a first suction stream 4a flows from the dust collecting tank 5 in the direction of the turbine 3 of the vacuum cleaner 1, the dust-laden air passes through the filter element 7a, wherein a great deal of the dust is filtered out of the suction stream 4a. In this way, the turbine 3 and the motor 22 (see, e.g. FIG. 3) of the vacuum cleaner 1 are protected against becoming dirty. The suction stream 4a is symbolized by the dashed-line arrows in FIG. 1.

Arranged within the first chamber 6a is an elastic membrane 11a, which is in the relaxed or first state in the exemplary embodiment illustrated in FIG. 1. According to the invention, this state of the elastic membrane 11a is preferably also referred to as the suction operation state. In this state, the elastic membrane 11a does not prevent or block the suction stream from flowing through the first chamber 6a, but rather lets it pass through substantially unimpeded. According to the invention, it is preferred that the elastic membrane 11a is substantially flat and arranged horizontally in the first chamber 6a in the first state, wherein the elastic membrane 11a is fixed to the side walls of the first chamber 6a. In particular, the elastic membrane 11a can be clamped in place or fastened between protrusions on the side walls of the first chamber 6a. However, other fastening methods are conceivable, as long as these allow the elastic membrane 11a to move within the first chamber 6a. The elastic membrane 11a is in particular designed such that an interior of the membrane 11a can move within the first chamber 6a. The elastic membrane 11a owes this movability advantageously to its highly elastic properties. The movability of the elastic membrane 11a can also be expressed by a change in shape or state of the elastic membrane 11a.

According to the invention, the expression "change in shape or state" means preferably that the elastic membrane 11a can, for example, bend or adapt or apply its shape to other objects, wherein such a change in shape or state of the elastic membrane 11a is brought about in particular by a change in the pressure conditions in the chamber 6a.

This can be the case for example when the negative pressure prevailing in the chamber 6a during suction operation is weakened by the chamber 6a being ventilated such that the pressure in the chamber 6a is adapted to or equalized with the pressure in the environment of the vacuum cleaner ("ambient pressure"). Depending on the magnitude of the change in pressure, the elastic membrane 11a can bend or move to a greater or lesser extent and take up for example a closed state (cf. FIGS. 4 and 7), in which the elastic membrane 11a closes off a turbine opening 9a of the chamber 6a, or the elastic membrane 11a can take up a dedusting state (cf. FIGS. 5 and 8), in which the elastic membrane 11a bears against the inner side walls of the chamber 6a and on the way there compresses the residual air remaining in the chamber 6a to such an extent that it applies a dedusting or pressure shock pulse to the filter element 7a to be dedusted. This dedusting pulse mechanically shakes the filter element 7a, with the result that the filter element 7a is dedusted.

The ventilation of the first chamber 6a can be brought about by actuation of the valve 10a. As a result of the valve 10a being moved, the ventilation opening 8a of the chamber 6a can be opened up. Preferably, the valve 10a can be put into a ventilation position (valve 10a opens up the ventilation opening 8a) from a suction operation position (valve 10a closes off the ventilation opening 8a) by means of an actuator 12a. In the ventilation position, a pressure equalizing stream 15 can pass from a ventilation channel 20a into the chamber 6a and in this way change the pressure in the chamber 6a. The change in pressure consists preferably in that a negative pressure prevailing during suction operation of the chamber 6a dissipates and is replaced by ambient pressure, which corresponds to the pressure in the environment of the vacuum cleaner 1. The valve 10a can have openings 14a, which can coincide with the ventilation opening 8a as a result of the valve 10a being moved, such that the ventilation opening 8a of the chamber 6a is opened up, such that the pressure equalizing stream 15 can pass from the ventilation channel 20a into the chamber 6a to be dedusted.

FIG. 1 schematically shows a first chamber 6a of the filter device 2 during suction operation, in which the turbine opening 9a of the first chamber 6a is open and the ventilation opening 8a of the first chamber 6a is closed. The suction stream 4a flows from the dust collecting tank 5 through the first chamber 6a and leaves the latter in the region of the turbine opening 9a. The turbine opening 9a opens into a flow channel portion 21a that connects the turbine opening 9a of the first chamber 6a to the turbine 3. In the context of the invention, provision can be made for a further opening, referred to as a bypass capillary 16a, to be present between the chamber 6a and the flow channel portion 21a. According to the invention, it is preferred that the bypass capillary 16a is designed to ensure equal or substantially equal pressure conditions above and below the membrane 11 in order to ensure the parked position of the membranes 11a, 11b.

Figure 2:
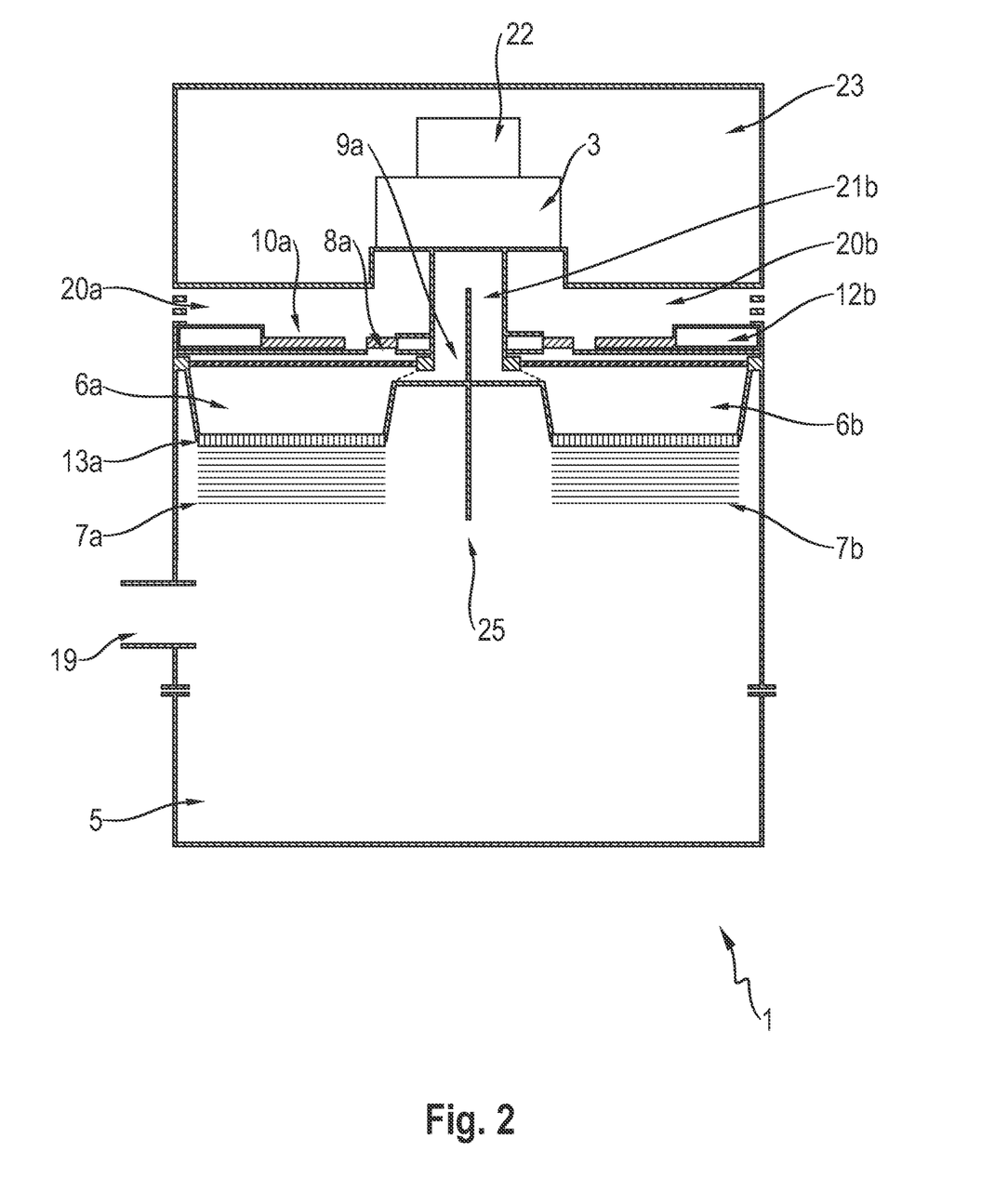
FIG. 2 shows a schematic illustration of the vacuum cleaner while both chambers are participating in suction operation

FIG. 2 shows a schematic illustration of the vacuum cleaner 1 while both chambers 6a, 6b of the vacuum cleaner 1 are participating in suction operation. Illustrated in a lower region of the vacuum cleaner 1 is the dust collecting tank 5, which has a suction hose inlet 19. A suction hose, which can be connected for example to a floor nozzle, can be attached to this suction hose inlet 19. Through the suction hose, dust particles or drilling dust can be sucked in. The sucked-in dust then passes through the suction hose inlet 19 into the dust collecting tank 5 of the vacuum cleaner 1.

The upper region of the vacuum cleaner 1 is formed by a vacuum cleaner head 23. Located in the vacuum cleaner head are, for example, the turbine 3 and the motor 22, with which the negative pressure for sucking in the dust particles and drilling dust is generated. Provided between the vacuum cleaner head 23 and the dust collecting tank 5 are ventilation channels 20a and 20b with which air can be sucked in from the environment of the vacuum cleaner 1 through openings in the housing. This air sucked in through the ventilation channels 20, 20b can form for example a pressure equalizing stream 15 when pressure equalization is intended to take place in the vacuum cleaner 1. Pressure equalizing streams 15 are illustrated for example in FIGS. 4, 5, 7 and 8. Pressure equalizing streams 15 can be used for example to weaken the negative pressure within the vacuum cleaner 1 and to interrupt the suction stream 4a, 4b in one of the chambers 6a, 6b in order to dedust a filter. It is necessary to dedust the filter elements 7a, 7b for example when the filter elements 7a, 7b of the filter device 2 are clogged with dust. The initially loose dust can solidify to form a filter cake 24 (see, e.g., FIG. 4), which can be detached from the filter elements 7a, 7b only with difficulty. With the present invention, particularly effective filter dedusting can advantageously be provided, in which in particular the suction operation of the vacuum cleaner 1 does not need to be interrupted during filter dedusting.

Provided between the dust collecting tank 5 and the vacuum cleaner head 23 are two chambers 6a, 6b, the filters 7a, 7b of which can be dedusted alternately according to the invention, while the suction operation of the vacuum cleaner 1 can be continued in the respectively other chamber 6a, 6b. The chambers 6a, 6b are configured in a substantially identical manner, but axisymmetric to a partition wall 25 separating the two chambers.

In FIG. 2, both chambers 6a, 6b are in suction operation and the elastic membranes 11a, 11b are in the relaxed or suction operation state. In this state, a suction stream 4a, 4b can pass from the collecting tank 5 of the vacuum cleaner 1 into the region of the turbine 3, with the suction streams 41a, 4b passing through the chambers 6a, 6b in the process. In particular, on their way, the suction streams 4a, 4b flow through the turbine openings 9a, 9b, which are located between the chambers 6a, 6b and the flow channel portions 21a, 21b. The flow channel portions 21a, 21b connect the turbine openings 9a, 9b to the turbine 3 and extend therebetween.

The chambers 6a, 6b also have ventilation openings 8a, 8b (see, e.g., FIG. 4), which can be opened or closed by valves 10a, 10b. The valves 10a, 10b can be moved by actuators 12a, 12b and having openings 14a, 14b, which can coincide with the ventilation openings 8a, 8b of the chambers 6a, 6b. When the openings 14a, 14b of the valves 10a, 10b coincide with the ventilation openings 8a, 8b of the chambers 6a, 6b, the ventilation openings 8a, 8b are open and a pressure equalizing stream 15 can pass into a chamber 6a or 6b to be dedusted, with the result that the negative pressure that prevails in the chamber 6a, 6b during suction operation is weakened or replaced by ambient pressure. The pressure equalizing stream 15 passes from the environment of the vacuum cleaner 1 via a ventilation channel 20a, 20b into the chambers 6a, 6b.

Figure 3:
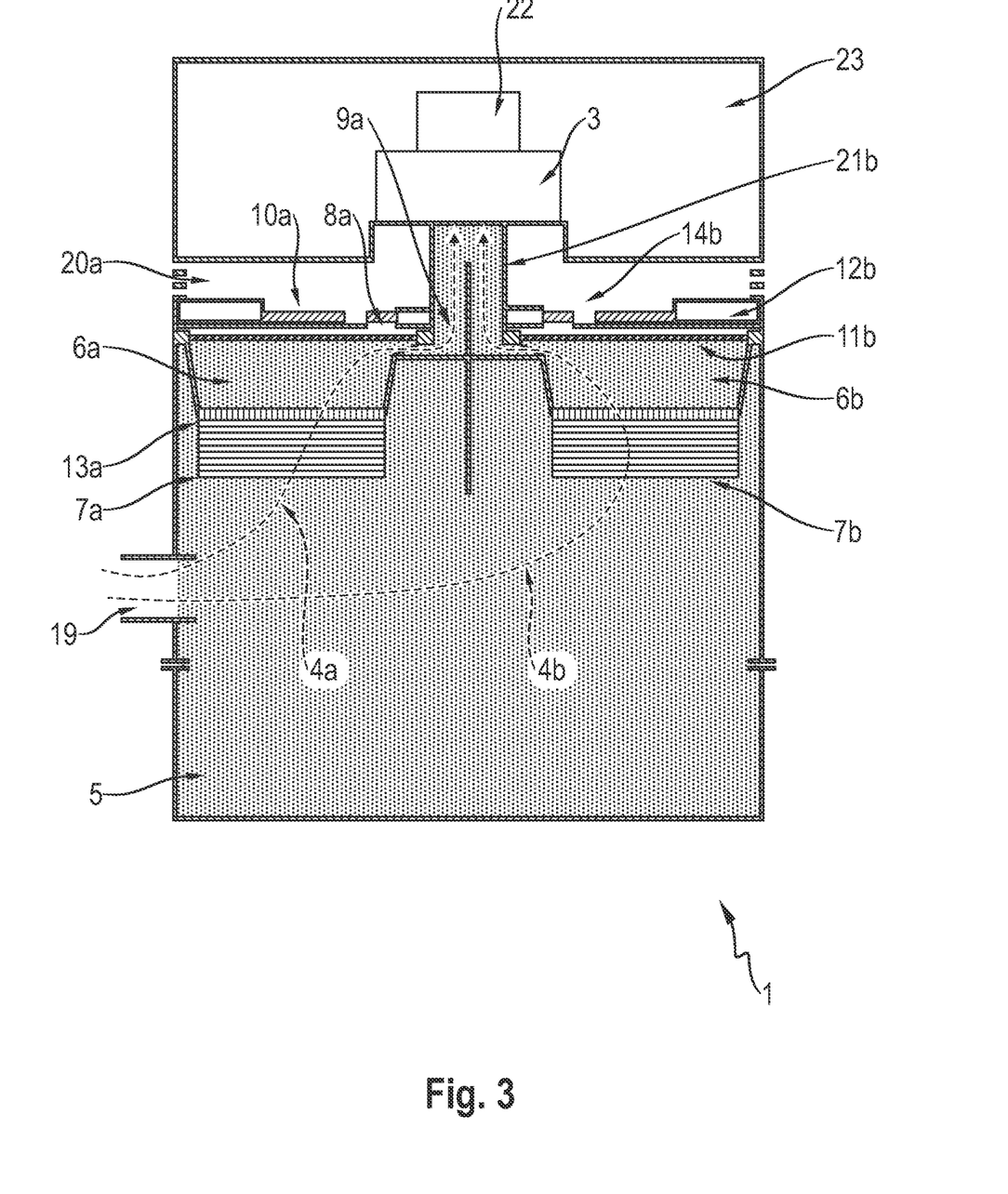
FIG. 3 shows a further schematic illustration of the vacuum cleaner while both chambers are participating in suction operation, in particular the pressure conditions in the vacuum cleaner

FIG. 3 shows a further schematic illustration of the vacuum cleaner 1 while both chambers 6a, 6b are participating in suction operation. In particular, FIG. 3 shows the pressure conditions in the vacuum cleaner 1 during suction operation. In FIGS. 3 to 9, regions of the vacuum cleaner 1 in which a negative pressure prevails are shown in a dark color. During suction operation, a negative pressure prevails in particular in the dust collecting tank 5, in the chambers 6a, 6b that are participating in suction operation, and in the flow channel portions 21a, 21b. The dashed lines in FIG. 3 indicate the flow paths of the suction air streams 4a, 4b through the vacuum cleaner 1.

Figure 4:
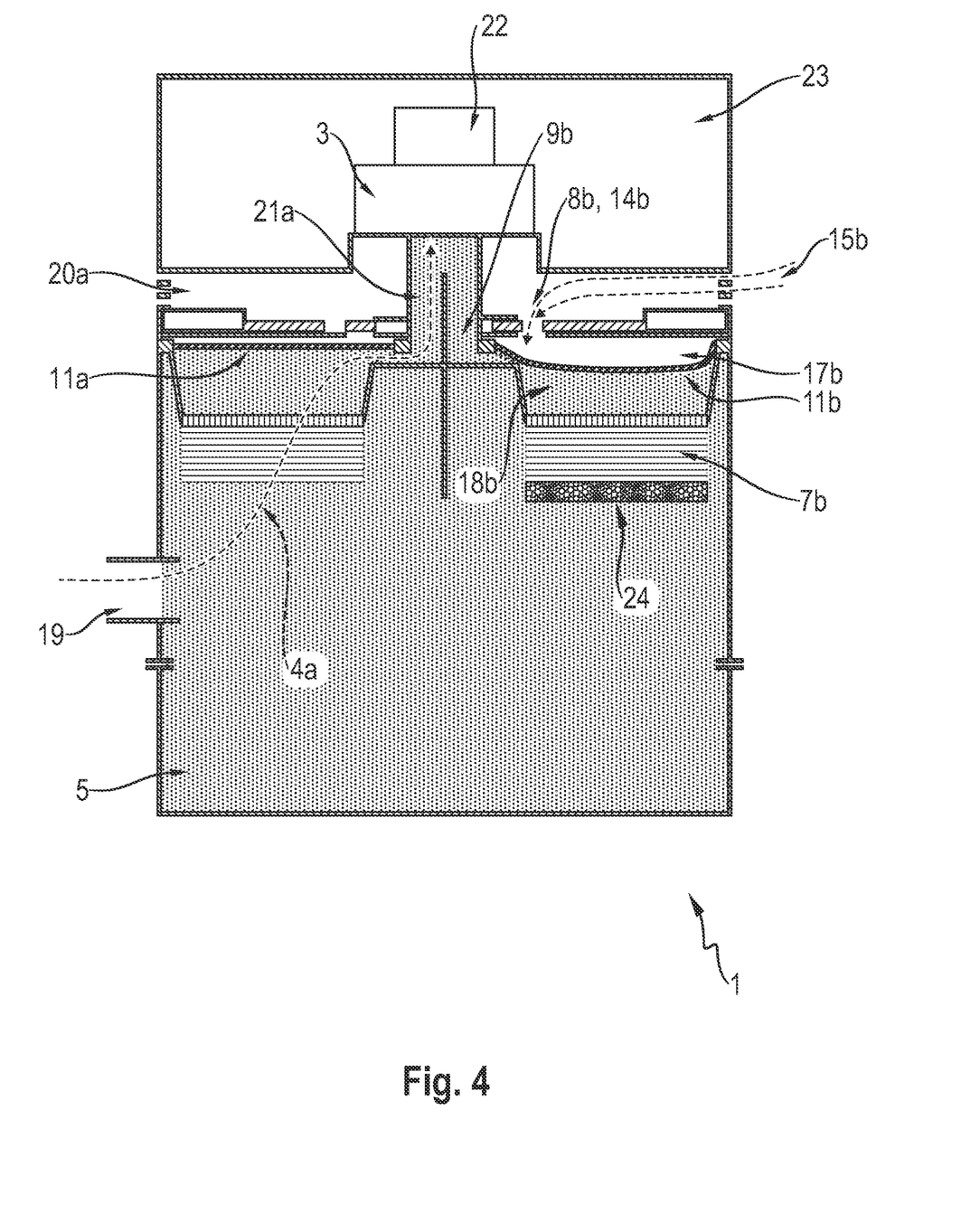
FIG. 4 shows a schematic illustration of the vacuum cleaner while the filter element of the second chamber is being dedusted

FIG. 4 shows a schematic illustration of the vacuum cleaner 1 while the filter element 7b of the second chamber 6b is being dedusted. In order to start the dedusting process, the valve 10b is actuated and the ventilation opening 8b opened as a result. A pressure equalizing stream 15b can pass into the chamber 6b and ensure that the pressure is equalized. The pressure equalization preferably ensures that the negative pressure that prevailed in the chamber 6b during suction operation is replaced by ambient pressure. In other words, the pressure in the chamber 6b is adapted to ambient pressure when the chamber 6b is ventilated and a pressure equalizing stream 15b flows into the chamber 6b through the ventilation opening 8b. The pressure equalizing stream 15b is illustrated by way of dashed-line arrows in the right-hand half of FIG. 4.

On account of the pressure equalization, the elastic membrane 11b in the chamber 6b changes shape or state such that it closes off the turbine opening 9b of the chamber 6b to be dedusted. As a result, the suction stream 4b through the second chamber 6b is interrupted while the suction stream 4a through the first chamber 6a continues to flow and ensures that suction operation of the vacuum cleaner 1 is maintained. The suction stream 4a through the first chamber 6a of the vacuum cleaner 1 is symbolized by the dashed line in the left-hand half of FIG. 4.

A filter cake 24 adhering to the second filter element 7b can also be seen in FIG. 4. The detachment of this filter cake 24 from the filter element 7b of the second chamber 6b is the aim of the filter dedusting that is started in FIG. 4. FIG. 4 also shows that a residual air volume 18b is enclosed between the elastic membrane 11b and the filter element 7b, wherein a ventilated space 17b is formed above the elastic membrane 11b and the internal top side of the chamber 6b.

FIG. 5 shows a dedusting state of the second chamber 6b of the vacuum cleaner 1. In this dedusting state, the elastic membrane 11b has moved further or changed its shape such that it now still closes the turbine opening 9b but furthermore also bears against the inner walls of the chamber 6b. In the way into this third state, the elastic membrane 11b has compressed the residual air volume 18b such that, as a result of the rapid compression, a dedusting pulse or compressed air shock is transmitted to the filter element 7b. As a result of the shock, the filter element 7b is mechanically shaken such that filter cake 24 adhering to the filter element 7b is shaken off and drops into the collecting tank 5 of the vacuum cleaner 1.

Figure 6:
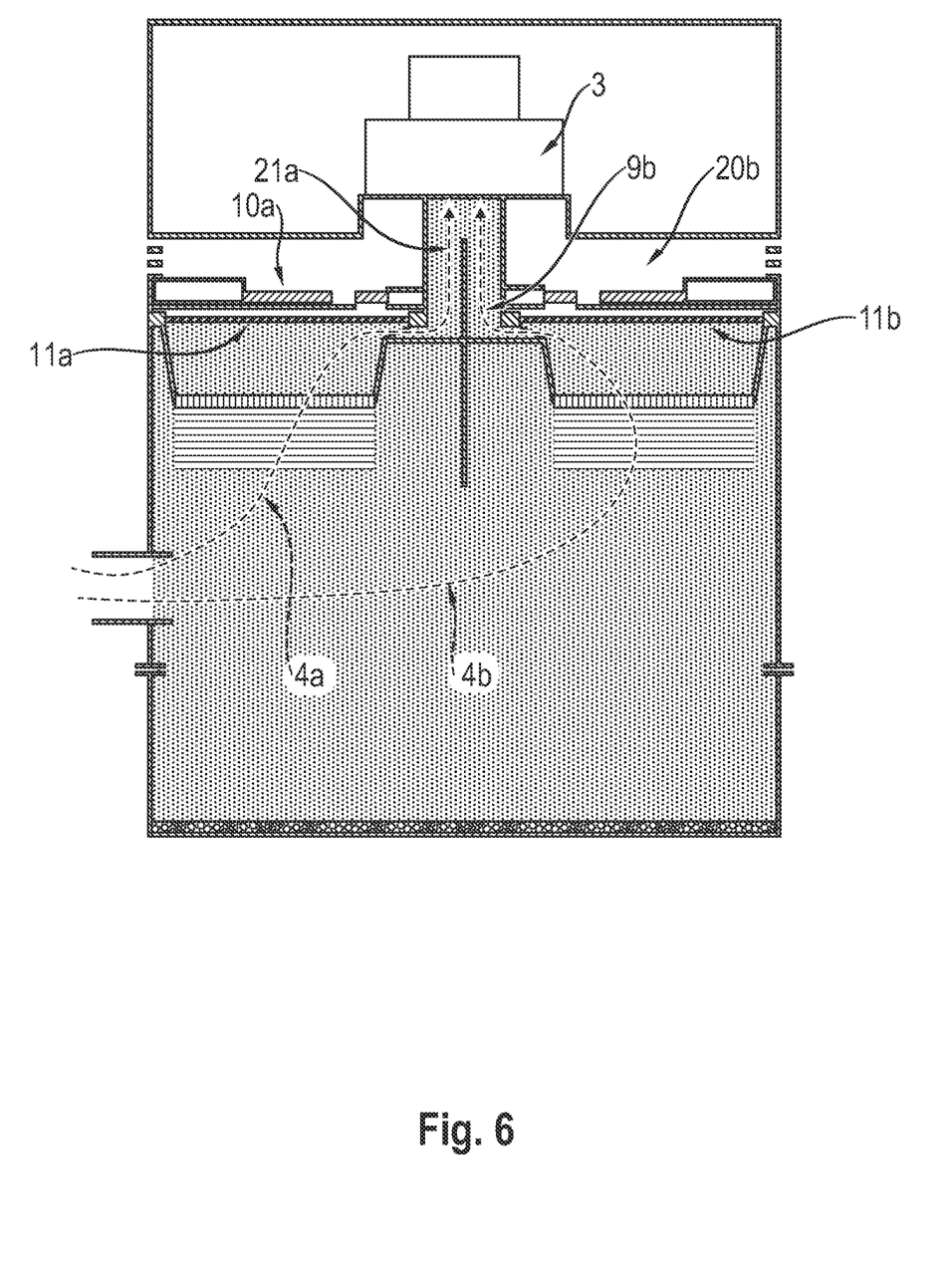
FIG. 6 shows a schematic illustration of the vacuum cleaner at the end of the dedusting process of the second chamber

FIG. 6 shows a schematic illustration of the vacuum cleaner 1 at the end of the dedusting process of the second chamber 6b. In order to end the dedusting process, the valve 10b is actuated and as a result the previously open ventilation opening 8b is closed, such that a negative pressure, which is necessary for suction operation, is again built up in the chamber 6b by the turbine 3. According to the invention, it is particularly preferred that the negative pressure builds up between the elastic membrane 11b and the filter element 7b. At the conclusion of the dedusting process, the elastic membrane 11b has moved back into the relaxed state, wherein this return movement is supported by the negative pressure building up again within the chamber 6b. In particular, the suction stream 4b building up again generates additional restoring forces, which act on the elastic membrane 11b and in the process support the membrane 11b as it returns into the relaxed state. After the end of the dedusting process of the second chamber 6b or of the filter element 7b in the second chamber 6b, both chambers 6a, 6b once again participate in the suction operation of the vacuum cleaner 1, and so both suction streams 4a, 4b flow through the vacuum cleaner 1. In the exemplary embodiment of the invention illustrated in FIG. 6, the ventilation openings 8a, 8b of the chambers 6a, 6b are each closed, while the turbine openings 9a, 9b to the flow channel portions 21a, 21b are open.

Figure 7:
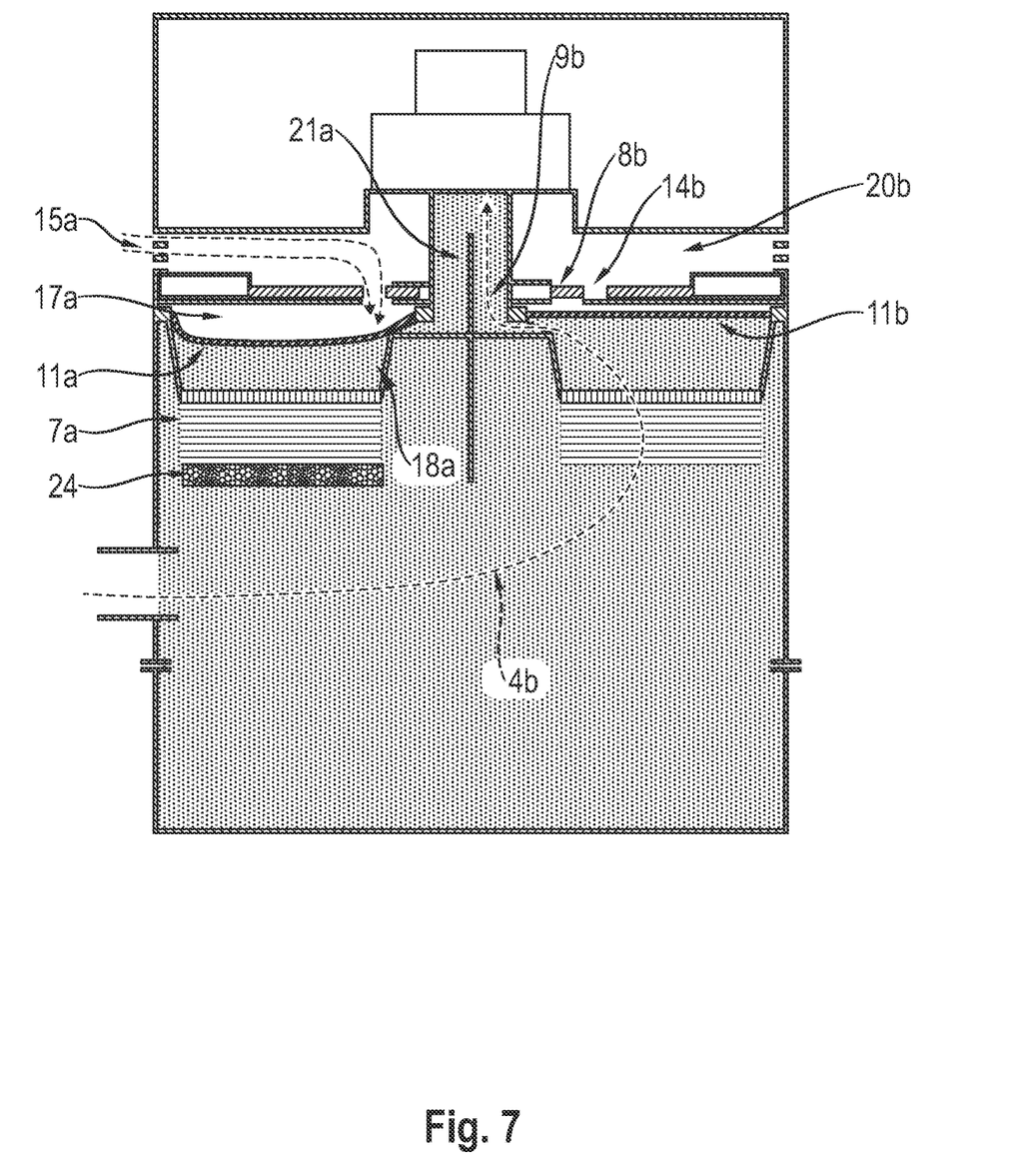
FIG. 7 shows a schematic illustration of the vacuum cleaner while the filter element of the first chamber is being dedusted
Figure 9:
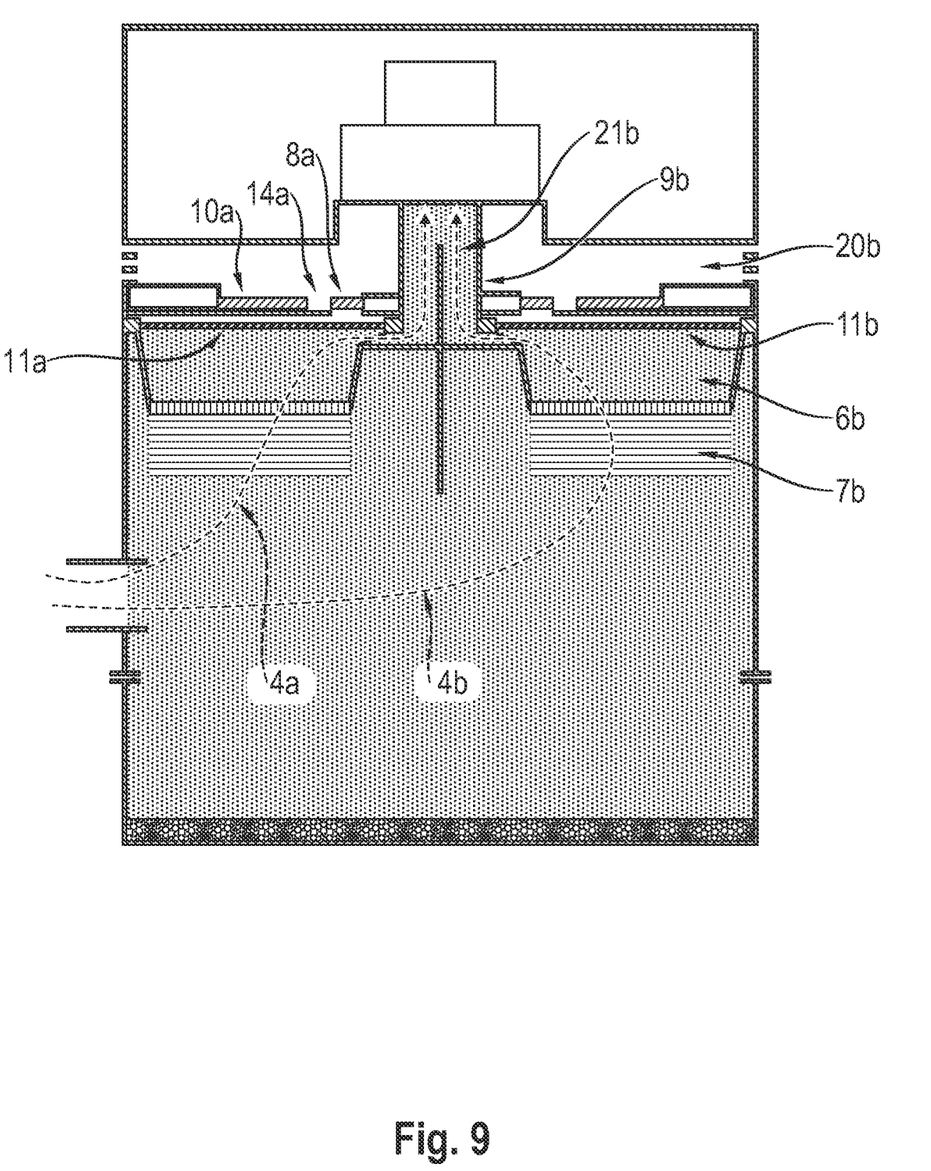
FIG. 9 shows a schematic illustration of the vacuum cleaner at the end of the dedusting process of the first chamber

FIGS. 7 to 9 show schematic illustrations of the vacuum cleaner 1 while the filter element 7a of the first chamber 6a is being dedusted. The figures and the contents thereof correspond substantially to FIGS. 4 to 6, wherein the reference sign "b" in the description should be replaced with an "a".

LIST OF REFERENCE SIGNS

1 Vacuum cleaner
2 Filter device
3 Turbine device
4 Main air stream, 4a: first main air stream, 4b: second main air stream
5 Collecting tank
6 Chamber, 6a: first chamber, 6b: second chamber
7 Filter element, 7a: first filter element, 7b: second filter element
8 Ventilation opening, 8a: first ventilation opening, 8b: second ventilation opening
9 Turbine opening, 9a: first turbine opening, 9b: second turbine opening
10 Valve, 10a: first valve, 10b: second valve
11 Elastic membrane, 11a: first elastic membrane, 11b: second elastic membrane
12 Actuator, 12a: actuator for the valve of the first chamber, 12b: actuator for the valve of the second chamber
13 Inflow opening, 13a: first inflow opening, 13b: second inflow opening
14 Openings in the valve
15 Pressure equalizing stream
16 Bypass capillary, 16a: first bypass capillary, 16b: second bypass capillary
17 Ventilated region between top side of the chambers and elastic membrane
18 Residual air volume
19 Suction hose inlet
20 Ventilation channel
21 Flow channel portion
22 Motor
23 Vacuum cleaner head
24 Filter cake
25 Partition wall

What is claimed is:

1. A filter device for a vacuum cleaner having a turbine device and a motor for generating a first main air stream or a second main air stream in the vacuum cleaner, the filter device comprising:
a first chamber and a second chamber, each having a filter element, a ventilation opening and a turbine opening, wherein, during suction operation through at least one of the first and second chambers, the turbine opening of the respective first or second chamber is open such that a flow connection exists between the respective first or second chamber and the turbine device, and the ventilation opening is closed such that a negative pressure prevails in the respective first or second chamber, a dedusting process of a filter element being initiated by actuation of a valve so that a pressure equalizing stream bringing about a change in pressure passes into the respective first or second chamber, wherein, as a result of the change in pressure, an elastic membrane is elastically stretched to close the turbine opening and a apply a dedusting pulse to the filter element.

2. The filter device as recited in claim 1 wherein a flow connection between the first or second chamber and the turbine device is formed by a flow channel portion.

3. The filter device as recited in claim 1 wherein the ventilation openings are arranged between the respective first and second chambers and ventilation channels.

4. The filter device as recited in claim 3 wherein the ventilation channels are arranged between a dust collecting tank and a vacuum cleaner head of the vacuum cleaner.

5. The filter device as recited in claim 1 wherein the valves are moved by actuators.

6. The filter device as recited in claim 3 wherein the valves have openings bringable into correspondence with the ventilation openings by movement of the valves, with the result that a flow connection is established between the ventilation openings and the ventilation channels.

7. The filter device as recited in claim 1 wherein the ventilation openings are opened or closed by actuating the valves.

8. The filter device as recited in claim 1 wherein the first and second main air streams pass from the dust collecting tank, through the filter elements and through inflow openings into the first and second chambers, wherein, during suction operation, the first and second main air streams pass further, through the open turbine opening, into flow channel portions.

9. A method for dedusting a filter device in a vacuum cleaner, the method comprising the following steps:
a) providing the filter device as recited in claim 1;
b) operating the vacuum cleaner, wherein, during operation of the vacuum cleaner, a negative pressure prevails in a collecting tank of the vacuum cleaner and in at least one of the first and second chambers of the vacuum cleaner;
c) actuating a valve, with the result that a ventilation opening is opened such that a pressure equalizing stream that brings about a change in pressure passes into the first or second chamber and, as a result of the change in pressure, a turbine opening of the first or second chamber is closed by an elastic membrane; and
d) dedusting the filter element via a dedusting pulse applied to the filter element by the elastic membrane.

10. The method as recited in claim 9 wherein the filter element of one of the first and second chambers is dedusted upon continued suction operation through the other of the first and second chambers.

* * * * *